(12) United States Patent
Okamatsu

(10) Patent No.: US 9,217,076 B2
(45) Date of Patent: Dec. 22, 2015

(54) EMULSION COAGULANT

(71) Applicant: THE YOKOHAMA RUBBER CO., LTD., Minato-Ku, Tokyo (JP)

(72) Inventor: Takahiro Okamatsu, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 14/650,674

(22) PCT Filed: Dec. 13, 2012

(86) PCT No.: PCT/JP2012/082362
§ 371 (c)(1),
(2) Date: Jun. 9, 2015

(87) PCT Pub. No.: WO2014/091601
PCT Pub. Date: Jun. 19, 2014

(65) Prior Publication Data
US 2015/0315368 A1    Nov. 5, 2015

(51) Int. Cl.
*C09K 3/00* (2006.01)
*C09K 3/10* (2006.01)
*C08L 5/04* (2006.01)
*B29C 73/16* (2006.01)
*C09K 3/12* (2006.01)

(52) U.S. Cl.
CPC ............... *C08L 5/04* (2013.01); *B29C 73/163* (2013.01); *C09K 3/00* (2013.01); *C09K 3/10* (2013.01); *C09K 3/12* (2013.01)

(58) Field of Classification Search
CPC ............. C09K 3/00; C09K 3/10; C09K 3/12; B29C 73/163
USPC .......................................................... 106/33
See application file for complete search history.

(56) References Cited

U.S. PATENT DOCUMENTS

| | | | | |
|---|---|---|---|---|
| 6,992,119 | B2 * | 1/2006 | Kojima | B29C 73/163 523/166 |
| 7,745,511 | B2 * | 6/2010 | Okamatsu | B29C 73/163 523/166 |
| 2009/0023837 | A1 | 1/2009 | Okamatsu et al. | |
| 2012/0010325 | A1 * | 1/2012 | Ishida | B29C 73/163 523/166 |
| 2013/0072594 | A1 * | 3/2013 | Okamatsu | B29C 73/163 523/166 |
| 2013/0172465 | A1 * | 7/2013 | Okamatsu | B29C 73/163 524/388 |
| 2014/0221527 | A1 * | 8/2014 | Naruse | B29C 73/163 523/166 |

FOREIGN PATENT DOCUMENTS

| | | | |
|---|---|---|---|
| JP | 2002-226636 A | 8/2002 | |
| JP | 2002-294214 A | 10/2002 | |
| JP | 2002-363331 A | 12/2002 | |
| JP | 2005-187751 A | 7/2005 | |
| JP | 2007-056057 A | 3/2007 | |
| JP | 4245654 B2 | 3/2009 | |
| JP | 2010-043155 A | 2/2010 | |
| WO | WO2013/024759 A1 * | 2/2013 | ............ C09K 3/10 |
| WO | WO2014/057937 A1 * | 4/2014 | ............ C09K 3/00 |

* cited by examiner

*Primary Examiner* — Anthony J Green
(74) *Attorney, Agent, or Firm* — Carrier Blackman & Associates, P.C.; Joseph P. Carrier; William D. Blackman

(57) ABSTRACT

An object of the present invention is to provide an emulsion coagulant which can be used to quickly coagulate a tire puncture sealing material in an extremely low temperature environment. The emulsion coagulant of the present invention is an emulsion coagulant comprising: component (A) having a particle size of from 35 to 100 μm and comprising at least one type selected from the group consisting of aluminum oxide, magnesium oxide, and silicon oxide; propylene glycol alginate; and component (B) comprising at least one type selected from the group consisting of calcium oxide, calcium chloride, calcium acetate, and urea; the amount of component (B) being from 3 to 30 mass % of the total amount of component (A), propylene glycol alginate, and component (B); and the emulsion coagulant being used to coagulate a tire puncture sealing material comprising an emulsion.

7 Claims, No Drawings

EMULSION COAGULANT

TECHNICAL FIELD

The present invention relates to an emulsion coagulant.

BACKGROUND

Conventionally, an emulsion coagulant has been used to recover a tire puncture repair material (tire puncture sealing material) after a tire puncture has been repaired using the tire puncture repair material.

As a coagulant, the present inventors have thus far proposed an emulsion coagulant for coagulating a tire puncture sealing material comprising emulsion particles, the emulsion coagulant comprising a mineral that induces aggregation of the emulsion particles by weakening a surface charge of the emulsion particles and/or by hydrogen bonding with the emulsion particles, and a gelling agent (Patent Document 1).

PRIOR ART DOCUMENT

Patent Document

Patent Document 1: Japanese Patent No. 4245654

SUMMARY OF THE INVENTION

Problem to be Solved by the Invention

The lower limit of the environmental temperature at which an emulsion coagulant is used within Japan was previously presumed to be −20° C., but overseas, it is necessary to use emulsion coagulants in very cold districts in even lower temperature environments (for example, an outside air temperature of −40° C.)

Therefore, an object of the present invention is to provide an emulsion coagulant which can be used to quickly coagulate a tire puncture sealing material in an extremely low temperature environment.

Means to Solve the Problem

As a result of conducting dedicated research in order to solve the problem described above, the present inventors discovered that a composition comprising component (A) having a particle size of from 35 to 100 μm and comprising at least one type selected from the group consisting of aluminum oxide, magnesium oxide, and silicon oxide; propylene glycol alginate; and component (B) comprising at least one type selected from the group consisting of calcium oxide, calcium chloride, calcium acetate, and urea; the amount of component (B) being from 3 to 30 mass % of a total amount of component (A), propylene glycol alginate, and component (B); is an emulsion coagulant which can be used to quickly coagulate a tire puncture sealing material in an extremely low temperature environment, and the present inventors thereby completed the present invention.

That is, the present invention provides the following emulsion coagulants:

1. An emulsion coagulant comprising component (A) having a particle size of from 35 to 100 μm and comprising at least one type selected from the group consisting of aluminum oxide, magnesium oxide, and silicon oxide; propylene glycol alginate; and
component (B) comprising at least one type selected from the group consisting of calcium oxide, calcium chloride, calcium acetate, and urea;
an amount of the component (B) being from 3 to 30 mass % of a total amount of the component (A), the propylene glycol alginate, and the component (B); and
the emulsion coagulant being used to coagulate a tire puncture sealing material comprising an emulsion.

2. The emulsion coagulant according to (1), wherein the emulsion is a natural rubber latex and/or a synthetic resin emulsion, and the tire puncture sealing material further comprising an antifreezing material.

3. The emulsion coagulant according to (2), wherein the antifreezing material comprises at least one type selected from the group consisting of ethylene glycol, propylene glycol, and diethylene glycol.

4. The emulsion coagulant according to any one of (1) to (3), wherein the amount of the emulsion coagulant described in any one of (1) to (3) that is used is at least 10 parts by mass per 100 parts by mass of the tire puncture sealing material.

5. The emulsion coagulant according to any one of (1) to (4), wherein the component (B) comprises at least one type selected from the group consisting of calcium oxide, calcium chloride, and calcium acetate, and the emulsion comprises at least natural rubber latex.

6. The emulsion coagulant according to any one of (1) to (5), wherein the emulsion coagulant is used in an environment with a temperature of from −40° C. to +70° C.

7. The emulsion coagulant according to any one of (1) to (6), an amount of the component (A) is from 1.5 to 7 mass % of the amount of the tire puncture sealing material.

Effect of the Invention

The emulsion coagulant of the present invention can quickly coagulate a tire puncture sealing material in an extremely low temperature environment.

BEST MODE FOR CARRYING OUT THE INVENTION

The present invention is explained in detail below.
The emulsion coagulant of the present invention is an emulsion coagulant comprising:
component (A) having a particle size of from 35 to 100 μm and comprising at least one type selected from the group consisting of aluminum oxide, magnesium oxide, and silicon oxide;
propylene glycol alginate; and
component (B) comprising at least one type selected from the group consisting of calcium oxide, calcium chloride, calcium acetate, and urea;
an amount of the component (B) being from 3 to 30 mass % of a total amount of the component (A), the propylene glycol alginate, and component (B); and
the emulsion coagulant being used to coagulate a tire puncture sealing material comprising an emulsion.

Component (A) contained in the emulsion coagulant of the present invention has a particle size of from 35 to 100 μm and comprises at least one type selected from the group consisting of aluminum oxide, magnesium oxide, and silicon oxide.

When the particle size of component (A) is from 35 to 100 μm, it is possible to quickly coagulate a tire puncture sealing material in an extremely low temperature environment. When the particle size of component (A) is at least 35 μm, it becomes easy for the emulsion coagulant to mix with a tire puncture sealing material in an extremely low temperature environment, which yields excellent coagulability of the tire puncture sealing material in an environment of this temperature (the "coagulability of the tire puncture sealing material" is also simply called "coagulability" hereafter). When the particle size of component (A) is at most 100 μm, it becomes easy to induce the coagulation of emulsion particles due to the large surface area of component (A), which is thought to yield excellent coagulability in an extremely low temperature environment.

The particle size of component (A) is preferably from 40 to 100 μm from the perspective that the emulsion coagulant has excellent coagulability in an extremely low temperature environment, can be used over a wider range of temperatures, and has excellent mixing dispersibility with the tire puncture sealing material.

The shape of component (A) may be particulate, for example.

A single component (A) may be used, or two or more types may be used in combination.

The propylene glycol alginate (propylene glycol alginate ester) contained in the emulsion coagulant of the present invention is not particularly limited. Examples thereof include conventionally known products.

The propylene glycol alginate may have a molecular structure having the following two repeating units.

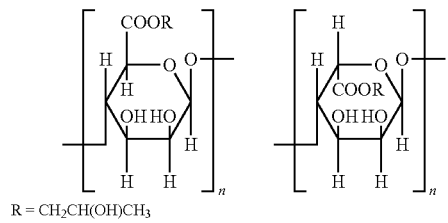

[Formula 1]

R = CH$_2$CH(OH)CH$_3$

In the formula, each n [n of an L-guluronic acid ester (left molecular structure), n of a D-mannuronic acid ester (right molecular structure)] is not particularly limited. Each n can be derived from a raw material (for example, an algae). The total of each n can be set to a number corresponding to the following weight average molecular weight.

The weight average molecular weight of propylene glycol alginate is preferably from 300 to 500,000 and more preferably from 500 to 300,000 from the perspective that the emulsion coagulant has excellent coagulability in an extremely low temperature environment, can be used over a wider range of temperatures, and has excellent mixing dispersibility with the tire puncture sealing material. In the present invention, the weight average molecular weight of propylene glycol alginate was determined by polyethylene glycol conversion by means of gel permeation chromatography (GPC) using dimethylformamide as a solvent.

The degree of esterification of propylene glycol alginate is preferably at least 10 mol % of the total amount of hydroxy groups contained in the alginic acid from the perspective that the emulsion coagulant has excellent coagulability in an extremely low temperature environment, can be used over a wider range of temperatures, and has excellent mixing dispersibility with the tire puncture sealing material.

The mass ratio of component (A) to propylene glycol alginate (component (A): propylene glycol alginate) is preferably from 16:84 to 62:38 and more preferably from 30:70 to 40:60 from the perspective that the emulsion coagulant has excellent coagulability in an extremely low temperature environment, can be used over a wider range of temperatures, and has excellent mixing dispersibility with the tire puncture sealing material.

Component (B) contained in the emulsion coagulant of the present invention comprises at least one type selected from the group consisting of calcium oxide, calcium chloride, calcium acetate, and urea.

Component (B) preferably comprises at least one type selected from the group consisting of calcium oxide, calcium chloride, and calcium acetate from the perspective that the emulsion coagulant has excellent coagulability in an extremely low temperature environment and can be used over a wider range of temperatures.

In addition, component (B) preferably comprises at least one type selected from the group consisting of calcium oxide, calcium chloride, and calcium acetate from the perspective of quickly coagulating a tire puncture sealing material comprising at least natural rubber latex in an extremely low temperature environment.

A single component (B) may be used or a combination of two or more of the component (B) may be used.

In the present invention, the amount of component (B) is from 3 to 30 mass % of the total amount of component (A), propylene glycol alginate, and component (B).

In addition, the total amount of component (A) and propylene glycol alginate is from 97 to 70 mass % of the total amount of component (A), propylene glycol alginate, and component (B).

In addition to component (A), propylene glycol alginate, and component (B), the emulsion coagulant of the present invention may also comprise additives such as, for example, fillers (for example, fillers other than component (A) and component (B)), anti-aging agents, antioxidants, pigments (dyes), plasticizers, thixotropic agents, UV absorbents, flame retardants, surfactants, dispersants, dehydrating agents, and antistatic agents as desired when necessary.

The production of the emulsion coagulant of the present invention is not particularly limited. For example, the emulsion coagulant can be produced by mixing component (A), propylene glycol alginate, component (B), and additives that can be used as necessary.

The emulsion coagulant of the present invention is used to coagulate a tire puncture sealing material.

The tire puncture sealing material to which the emulsion coagulant of the present invention is applied is in the form of an emulsion in one preferred aspect. In addition, the tire puncture sealing material comprises an emulsion in one preferred aspect. The emulsion comprises emulsion particles. The tire puncture sealing material may comprise emulsion particles (for example, polymer particles contained in an emulsion).

Examples of the emulsion contained in the tire puncture sealing material include natural rubber latex (comprising natural rubber particles as emulsion particles), synthetic resin emulsions (comprising synthetic resin particles as emulsion particles), and synthetic rubber emulsions (comprising synthetic rubber particles as emulsion particles).

The emulsion particles contained in the tire puncture sealing material are polymer particles in one preferred aspect, and specific examples of polymers include natural rubbers, synthetic resins, and synthetic rubbers.

The synthetic emulsion serving as an emulsion that can be used in the tire puncture sealing material is not particularly limited, and examples thereof include conventionally known products. Examples of synthetic resin emulsions include urethane emulsions, acrylic emulsions, polyolefin emulsions, ethylene vinyl acetate copolymer emulsions, polyvinyl acetate emulsions, ethylene-vinyl acetate-vinyl versatate copolymer emulsions, and polyvinyl chloride emulsions.

The synthetic rubber latex serving as an emulsion that can be used in the tire puncture sealing material is not particularly limited, and examples thereof include conventionally known products. Specific examples include latexes of synthetic rubbers such as styrene-butadiene rubber (SBR), acrylonitrile-butadiene rubber (NBR), and chloroprene rubber (CR).

The production of the emulsion is not particularly limited. Examples thereof include conventionally known products. The emulsion can be used alone, or two or more types can be used in combination.

The emulsion is preferably natural rubber latex and/or a synthetic resin emulsion from the perspective of having excellent sealing performance and excellent in-vehicle stability.

Of these, ethylene vinyl acetate emulsions (for example, ethylene vinyl acetate copolymer emulsions), natural rubber latex, and vinyl acetate emulsions are preferable from the perspective of being inexpensive and easy to obtain. The natural rubber latex, ethylene vinyl acetate emulsions, and vinyl acetate emulsions are not particularly limited. Examples of each include conventionally known products.

The amount of the emulsion particles is preferably from 10 to 50 mass % and more preferably from 20 to 45 mass % of the tire puncture sealing material from the perspective of yielding excellent sealing performance and excellent mixing dispersibility with the tire puncture sealing material.

The tire puncture sealing material preferably further comprises an antifreezing material from the perspective of yielding an excellent effect of reducing the solidification point. Examples of the antifreezing agent contained in the tire puncture sealing material include ethylene glycol, propylene glycol, and diethylene glycol. One of these may be used alone, or two or more may be used in combination. The antifreezing agent preferably comprises at least one type selected from the group consisting of ethylene glycol, propylene glycol, and diethylene glycol from the perspective of having an excellent effect of reducing the coagulation point.

The amount of the antifreezing agent is preferably from 100 to 500 parts by mass, more preferably from 120 to 350 parts by mass, and even more preferably from 140 to 300 parts by mass per 100 parts by mass of solid content in the emulsion serving as the tire puncture sealing material from the perspective of yielding excellent performance in preventing the freezing of the tire puncture sealing material.

The tire puncture sealing material may further comprise a tackifier. Examples of the tackifier include rosin-based resins such as rosin resins, polymerized rosin resins, rosin ester resins, polymerized rosin ester resins, modified rosins, and the like; terpene phenol resins; terpene resins such as aromatic terpenes and the like; hydrogenated terpene resins (terpene resins to which hydrogen has been added); phenolic resins; xylene resins; and the like.

In addition, from the perspective of having excellent compatibility with the emulsion contained in the tire puncture sealing material, an example of a preferable aspect is one in which an emulsion is obtained by emulsifying these resins. One of these may be used alone, or two or more may be used in combination.

The amount of solid content of the tackifier is preferably from 50 to 200 parts by mass, more preferably from 70 to 200 parts by mass, and even more preferably from 80 to 180 parts by mass per total of 100 parts by mass of solid content in the emulsion serving as the tire puncture sealing material from the perspective of yielding excellent sealability.

In addition to each of the components described above, the tire puncture sealing material may comprise additives such as fillers such as cellulose, anti-aging agents, antioxidants, pigments (dyes), plasticizers, thixotropic agents, UV absorbents, flame retardants, surfactants (including leveling agents), dispersants, dehydrating agents, and antistatic agents as desired when necessary.

The amount of the fillers is preferably from 1 to 50 parts by mass and more preferably from 5 to 30 parts by mass of the entire amount of the tire puncture sealing material from the perspective of yielding excellent sealability.

The production method of the tire puncture sealing material is not particularly limited. An example thereof is a method in which the emulsion, the antifreezing agent, and the tackifier and additives that may be used as necessary are placed in a container and then sufficiently kneaded under reduced pressure using a mixer such as a combination mixer.

The emulsion coagulant of the present invention can be used for a used or unused tire puncture sealing material. When the emulsion coagulant of the present invention is used, the emulsion coagulant of the present invention is preferably mixed with the tire puncture sealing material. After mixing, the tire puncture sealing material solidifies.

The amount of the emulsion coagulant of the present invention that is used is preferably at least 10 parts by mass and more preferably from 10 to 50 parts by mass per 100 parts by mass of the tire puncture sealing material from the perspective that the emulsion coagulant has excellent coagulability in an extremely low temperature environment, can be used over a wider range of temperatures, and has excellent mixing dispersibility with the tire puncture sealing material.

The amount of component (A) in the emulsion coagulant of the present invention is preferably from 1.5 to 7 mass % and more preferably from 2 to 7 mass % of the amount of the tire puncture sealing material from the perspective of yielding excellent sealing performance.

The amount of propylene glycol alginate in the emulsion coagulant of the present invention is preferably from 2 to 9 mass % and more preferably from 3 to 8 mass % of the tire puncture sealing material from the perspective of yielding excellent sealing performance.

The amount of component (B) in the emulsion coagulant of the present invention is preferably from 0.5 to 3 mass %, more preferably from 0.6 to 2.5 mass %, and even more preferably from 1 to 2.5 mass % of the tire puncture sealing material from the perspective of yielding excellent sealing performance.

The emulsion coagulant of the present invention can quickly coagulate a tire puncture sealing material in an extremely low temperature environment (for example, an outside air temperature of −40° C.) and has excellent coagulability.

In addition, the emulsion coagulant of the present invention can quickly coagulate a tire puncture sealing material in environments with a wide range of temperatures. The emulsion coagulant of the present invention can be used, for example, in environments with a wide range of temperature conditions such as from −40° C. to 70° C. The emulsion coagulant of the present invention can be used in environments with temperature conditions of from −40 to +70° C.

Examples of the form (for example, the usage form or marketing form) of the emulsion coagulant of the present invention include the emulsion coagulant alone and a set including the emulsion coagulant and a tire puncture sealing material (tire puncture repair kit). A set including the emulsion coagulant and a tire puncture sealing material can be used as an emergency tire puncture repair kit. In addition, the emulsion coagulant of the present invention can be used to coagulate an unused tire puncture sealing material.

EXAMPLES

The present invention will now be described in greater detail using the following examples. However, the present invention is not limited to such working examples.

<Production of Tire Puncture Sealing Materials>

Tire puncture sealing materials were produced by mixing the components shown in the tables below using the amounts (parts by mass) shown in the table.

<Production of Emulsion Coagulants>

Emulsion coagulants were produced by mixing the components shown in the tables below using the amounts (parts by mass) shown in the tables.

In each table, the amount of the emulsion coagulant with respect to the tire puncture sealing material (phr) refers to the amount (parts by mass) of the emulsion coagulant per 100 parts by mass of the tire puncture sealing material.

<Evaluation>

After the emulsions coagulant produced as described above were added in the amounts (phr) shown in each table and mixed with the tire puncture sealing materials produced as described above, the time (units: minutes) until the mixtures gelatinized under conditions at −40° C. or 70° C. was measured. The results are shown in the tables.

TABLE 1-I

| Table 1 | Working Example Comparative Example | | 1 | 2 | 3 | 4 | 5 |
|---|---|---|---|---|---|---|---|
| Tire puncture sealing material | Emulsion | NR EVA | 50 | 50 | 50 | 50 | 50 |
| | Anti-freezing agent | EG PG DEG | 30 | 30 | 30 | 30 | 30 |
| | Filler | Cellulose | 10 | 10 | 10 | 10 | 10 |
| | Total | | 90 | 90 | 90 | 90 | 90 |
| Emulsion coagulant | Component A | Alumina Particle size μm | 20 35 50 1.6 100 120 | 2 | 4 | 5 | 6 |
| | | MgO Particle size μm | 50 100 | | | | |
| | PG alginate | | 8.4 | 8 | 6 | 5 | 4 |
| | Component B | Ca oxide Ca chloride Ca acetate Urea | 1 | 1 | 1 | 1 | 1 |
| | Total coagulant | | 11 | 11 | 11 | 11 | 11 |
| Amount of (B) in the total amount of (A) + PG alginate + (B) (mass %) | | | 9.09 | 9.09 | 9.09 | 9.09 | 9.09 |
| Amount of emulsion coagulant with respect to the tire puncture sealing agent (phr) | | | 11 | 11 | 11 | 11 | 11 |
| Coagulation time (minutes) at −40° C. | Specs: within 30 minutes | | 25 | 25 | 20 | 20 | 20 |
| Coagulation time (minutes) at 70° C. | Specs: within 15 minutes | | — | — | 10 | — | — |

TABLE 1-II

| Table 1 | Working Example Comparative Example | | 6 | 7 | 8 | 9 | 10 |
|---|---|---|---|---|---|---|---|
| Tire puncture sealing material | Emulsion | NR EVA | 50 | 50 | 50 | 50 | 50 |
| | Anti-freezing agent | EG PG DEG | 30 | 30 | 30 | 30 | 30 |
| | Filler | Cellulose | 10 | 10 | 10 | 10 | 10 |
| | Total | | 90 | 90 | 90 | 90 | 90 |
| Emulsion coagulant | Component A | Alumina Particle size μm | 20 35 50 6.2 100 120 | 6 | 6 | | |
| | | MgO Particle size μm | 50 100 | | | 5 | 5 |
| | PG alginate | | 3.8 | 4 | 4 | 5 | 5 |
| | Component B | Ca oxide Ca chloride Ca acetate Urea | 1 | 1 | 1 | 1 | 1 |
| | Total coagulant | | 11 | 11 | 11 | 11 | 11 |
| Amount of (B) in the total amount of (A) + PG alginate + (B) (mass %) | | | 9.09 | 9.09 | 9.09 | 9.09 | 9.09 |
| Amount of emulsion coagulant with respect to the tire puncture sealing agent (phr) | | | 11 | 11 | 11 | 11 | 11 |
| Coagulation time (minutes) at −40° C. | Specs: within 30 minutes | | 25 | 20 | 20 | 20 | 20 |
| Coagulation time (minutes) at 70° C. | Specs: within 15 minutes | | — | — | 10 | — | — |

TABLE 1-III

| Table 1 | Working Example Comparative Example | | 11 | 12 | 1 | 2 | 3 |
|---|---|---|---|---|---|---|---|
| Tire puncture sealing material | Emulsion | NR EVA | 50 | 50 | 50 | 50 | 50 |
| | Anti-freezing agent | EG PG DEG | 30 | 30 | 30 | 30 | 30 |
| | Filler | Cellulose | 10 | 10 | 10 | 10 | 10 |
| | Total | | 90 | 90 | 90 | 90 | 90 |
| Emulsion coagulant | Component A | Alumina Particle size μm | 20 35 50 3 100 3 120 3 | 3 | 6 | 6 | 6 |
| | | MgO Particle size μm | 50 100 | 2 | | | |
| | PG alginate | | 4 | 2 | 4 | 4 | 4 |

TABLE 1-III-continued

| Table 1 | Working Example Comparative Example | | 11 | 12 | 1 | 2 | 3 |
|---|---|---|---|---|---|---|---|
| | Component B | Ca oxide | 1 | 1 | | | 1 |
| | | Ca chloride | | | | | |
| | | Ca acetate | | | | | |
| | | Urea | | | | | |
| | Total coagulant | | 11 | 11 | 10 | 10 | 11 |
| Amount of (B) in the total amount of (A) + PG alginate + (B) (mass %) | | | 9.09 | 9.09 | 0.00 | 0.00 | 9.09 |
| Amount of emulsion coagulant with respect to the tire puncture sealing agent (phr) | | | 11 | 11 | 10 | 10 | 11 |
| Coagulation time (minutes) at −40° C. | Specs: within 30 minutes | | 20 | 25 | 50 | 60 | 45 |
| Coagulation time (minutes) at 70° C. | Specs: within 15 minutes | | — | — | — | — | — |

TABLE 2-I

| Table 2 | Working Example Comparative Example | | 13 | 14 | 15 | 16 | 17 |
|---|---|---|---|---|---|---|---|
| Tire puncture sealing material | Emulsion | NR | 50 | 50 | 30 | 50 | 30 |
| | | EVA | | | | | 30 |
| | Anti-freezing agent | EG | | | | | 35 |
| | | PG | 40 | 40 | 60 | | |
| | | DEG | | | | 40 | |
| | Filler | Cellulose | 10 | 10 | 10 | 10 | 5 |
| | Total | | 100 | 100 | 100 | 100 | 100 |
| Emulsion coagulant | Component A | Alumina Particle size μm | 20 35 50 100 120 | 5 | 5 | 5 | |
| | | MgO Particle size μm | 50 100 | | | | 4 |
| | | PG alginate | 5 | 5 | 5 | 5 | 6 |
| | Component B | Ca oxide | | | | | 2 |
| | | Ca chloride | 0.7 | 1 | | | |
| | | Ca acetate | | | 1 | | |
| | | Urea | | | | 1 | |
| | Total coagulant | | 10.7 | 11 | 11 | 11 | 12 |
| Amount of (B) in the total amount of (A) + PG alginate + (B) (mass %) | | | 6.54 | 9.09 | 9.09 | 9.09 | 16.67 |
| Amount of emulsion coagulant with respect to the tire puncture sealing agent (phr) | | | 10.7 | 11 | 11 | 11 | 12 |
| Coagulation time (minutes) at −40° C. | Specs: within 30 minutes | | 30 | 25 | 30 | 25 | 20 |
| Coagulation time (minutes) at 70° C. | Specs: within 15 minutes | | 15 | 15 | 10 | 10 | 15 |

TABLE 2-II

| Table 2 | Working Example Comparative Example | | 18 | 19 | 20 | 21 |
|---|---|---|---|---|---|---|
| Tire puncture sealing material | Emulsion | NR | 20 | 10 | 30 | 20 |
| | | EVA | 30 | 40 | | 40 |
| | Anti-freezing agent | EG | | | 30 | |
| | | PG | 40 | | 40 | 40 |
| | | DEG | | 30 | | |
| | Filler | Cellulose | 10 | 20 | 30 | 0 |
| | Total | | 100 | 100 | 100 | 100 |
| Emulsion coagulant | Component A | Alumina Particle size μm | 20 35 50 100 120 | | | |
| | | MgO Particle size μm | 50 100 | 4 | 4 | 4 |
| | | PG alginate | 6 | 6 | 6 | 6 |
| | Component B | Ca oxide | 2 | | | 2 |
| | | Ca chloride | | | 2 | |
| | | Ca acetate | | | | |
| | | Urea | | 2 | | |
| | Total coagulant | | 12 | 12 | 12 | 12 |
| Amount of (B) in the total amount of (A) + PG alginate + (B) (mass %) | | | 16.67 | 16.67 | 16.67 | 16.67 |
| Amount of emulsion coagulant with respect to the tire puncture sealing agent (phr) | | | 12 | 12 | 12 | 12 |
| Coagulation time (minutes) at −40° C. | Specs: within 30 minutes | | 20 | 25 | 20 | 20 |
| Coagulation time (minutes) at 70° C. | Specs: within 15 minutes | | 10 | 10 | 10 | 10 |

TABLE 2-III

| Table 2 | Working Example Comparative Example | | 22 | 23 | 24 | 4 |
|---|---|---|---|---|---|---|
| Tire puncture sealing material | Emulsion | NR | 20 | 20 | 20 | 20 |
| | | EVA | 30 | 30 | 30 | 30 |
| | Anti-freezing agent | EG | | | | |
| | | PG | | 40 | 40 | 40 |
| | | DEG | 40 | | | |
| | Filler | Cellulose | 10 | 10 | 10 | 10 |
| | Total | | 100 | 100 | 100 | 100 |
| Emulsion coagulant | Component A | Alumina Particle size μm | 20 35 50 100 120 | 4 | 5 | 5 5.2 |
| | | MgO Particle size μm | 50 100 | | | |
| | | PG alginate | 3.2 | 6 | 6 | 4.8 |
| | Component B | Ca oxide | 2.8 | 3 | 4 | 5 |
| | | Ca chloride | | | | |
| | | Ca acetate | | | | |
| | | Urea | | | | |
| | Total coagulant | | 10 | 14 | 15 | 15 |
| Amount of (B) in the total amount of (A) + PG alginate + (B) (mass %) | | | 28.00 | 21.43 | 26.67 | 33.33 |

TABLE 2-III-continued

| Table 2 | Working Example Comparative Example | 22 | 23 | 24 | 4 |
|---|---|---|---|---|---|
| Amount of emulsion coagulant with respect to the tire puncture sealing agent (phr) | | 10 | 14 | 15 | 15 |
| Coagulation time (minutes) at −40° C. | Specs: within 30 minutes | 20 | 10 | 15 | 35 |
| Coagulation time (minutes) at 70° C. | Specs: within 15 minutes | — | — | 15 | — |

TABLE 2-IV

| Table 2 | | | Working Example Comparative Example | 5 | 6 | 7 |
|---|---|---|---|---|---|---|
| Tire puncture sealing material | Emulsion | NR | | 20 | 20 | 20 |
| | | EVA | | 30 | 30 | 30 |
| | Antifreezing agent | EG | | 40 | 40 | 40 |
| | | PG | | | | |
| | | DEG | | | | |
| | Filler | Cellulose | | 10 | 10 | 10 |
| | Total | | | 100 | 100 | 100 |
| Emulsion coagulant | Component A | Alumina Particle size μm | 20 35 50 100 120 | | 7 | 5 6 |
| | | MgO Particle size μm | 50 100 | | | |
| | | PG alginate | | 10 | 9 | 5 |
| | Component B | Ca oxide Ca chloride Ca acetate Urea | | 10 | 15 | 0.3 |
| | Total coagulant | | | 27 | 30 | 10.3 |
| Amount of (B) in the total amount of (A) + PG alginate + (B) (mass %) | | | | 37.04 | 50.00 | 2.91 |
| Amount of emulsion coagulant with respect to the tire puncture sealing agent (phr) | | | | 27 | 30 | 10.3 |
| Coagulation time (minutes) at −40° C. | Specs: within 30 minutes | | | 40 | 50 | 60 or greater |
| Coagulation time (minutes) at 70° C. | Specs: within 15 minutes | | | 10 | 20 | 20 |

The details of the components shown in each table above are as follows.

Emulsion NR: natural rubber latex, trade name: HA Latex, produced by Golden Hope Co., Ltd., solid content: 60 mass %

Emulsion EVA: ethylene vinyl acetate copolymer emulsion, trade name: Sumika Flex S-408HQE, produced by Sumika Chemtex Co., Ltd., solid content: 51 mass %

Antifreezing agent EG: ethylene glycol, produced by Wako Pure Chemical Industries Co., Ltd., solid content: 100 mass %

Antifreezing agent PG: polypropylene glycol, produced by Wako Pure Chemical Industries Co., Ltd., solid content: 100 mass %

Antifreezing agent DEG: diethylene glycol, produced by Wako Pure Chemical Industries Co., Ltd., solid content: 100 mass %

Cellulose: hydroxyethylcellulose, AX15, produced by Sumitomo Seika Chemicals Co., Ltd.

Alumina, particle size 20 μm: aluminum oxide, particle size: 20 μm, trade name: CBA20S, produced by Showa Denko Co., Ltd.

Alumina, particle size 35 μm: aluminum oxide, particle size: 35 μm, trade name: AS-10, produced by Showa Denko Co., Ltd.

Alumina, particle size 50 μm: aluminum oxide, particle size: 50 μm, trade name: A13M, produced by Showa Denko Co., Ltd.

Alumina, particle size 100 μm: aluminum oxide, particle size: 100 μm, trade name: A12C, produced by Showa Denko Co., Ltd.

Alumina, particle size 120 μm: aluminum oxide, particle size: 120 μm, trade name: AL13CT, produced by Showa Denko Co., Ltd.

MgO, particle size 50 μm: magnesium oxide, particle size: 50 μm, trade name: RF50SC, produced by Ube Materials Co., Ltd.

MgO, particle size 100 μm: magnesium oxide, particle size: 100 μm, trade name: RF100SC, produced by Ube Materials Co., Ltd.

PG alginate: propylene glycol alginate ester, produced by Wako Pure Chemical Industries Co., Ltd., weight average molecular weight (or viscosity): 150,000, degree of esterification: 15 mol %

Ca oxide: calcium oxide, produced by Wako Pure Chemical Industries Co., Ltd.

Ca chloride: calcium chloride, produced by Wako Pure Chemical Industries Co., Ltd.

Ca acetate: calcium acetate, produced by Wako Pure Chemical Industries Co., Ltd.

Urea: produced by Wako Pure Chemical Industries Co., Ltd.

As is clear from the results shown in each table above, the coagulation of the tire puncture sealing material was slow and coagulability was poor under extremely low temperature conditions in Comparative Examples 1 and 2 having an aluminum oxide particle size of less than 35 μm or greater than 100 μm and not comprising component (B) and Comparative Example 3 having an aluminum oxide particle size of greater than 100 μm. In Comparative Examples 4 to 6 in which the amount of component (B) was greater than 30 mass % of the total amount of component (A), propylene glycol alginate, and component (B) and Comparative Example 7 in which the amount of component (B) was less than 3 mass %, the coagulation of the tire puncture sealing material was slow and coagulability was poor under extremely low temperature conditions.

In contrast, Working Examples 1 to 24 quickly coagulated the tire puncture sealing materials and demonstrated excellent coagulability under extremely low temperature conditions and high temperature conditions.

As described above, the emulsion coagulant of the present invention can be used to quickly coagulate a tire puncture sealing material in an extremely low temperature environment. In addition, the emulsion coagulant of the present invention can be used to quickly coagulate a tire puncture sealing material in environments of a wide range of temperatures from extremely low temperatures to high temperatures.

What is claimed is:
1. An emulsion coagulant comprising:
component (A) having a particle size of from 35 to 100 μm and comprising at least one type selected from the group consisting of aluminum oxide, magnesium oxide, and silicon oxide;

propylene glycol alginate; and component (B) comprising at least one type selected from the group consisting of calcium oxide, calcium chloride, calcium acetate, and urea;

an amount of component (B) being from 3 to 30 mass % of a total amount of the component (A), the propylene glycol alginate, and the component (B); and the emulsion coagulant being used to coagulate a tire puncture sealing material comprising an emulsion.

2. The emulsion coagulant according to claim 1, wherein the emulsion is at least one selected from the group consisting of natural rubber latex and a synthetic resin emulsion, and the tire puncture sealing material further comprises an antifreezing material.

3. The emulsion coagulant according to claim 2, wherein the antifreezing material comprises at least one type selected from the group consisting of ethylene glycol, propylene glycol, and diethylene glycol.

4. The emulsion coagulant according to claim 1, wherein the amount of the emulsion coagulant that is used is at least 10 parts by mass per 100 parts by mass of the tire puncture sealing material.

5. The emulsion coagulant according to claim 1, wherein the component (B) comprises at least one type selected from the group consisting of calcium oxide, calcium chloride, and calcium acetate, and the emulsion comprises at least natural rubber latex.

6. The emulsion coagulant according to claim 1, wherein the emulsion coagulant is used in an environment with a temperature of from −40° C. to +70° C.

7. The emulsion coagulant according to claim 1, an amount of the component (A) is from 1.5 to 7 mass % of the amount of the tire puncture sealing material.

* * * * *